○ ● —CHLORIDE
□ ■ —BROMIDE
S—MATERIAL PREPARED WITH SULFUR
FS—MATERIAL RECEIVED FUSED SALT TREATMENT

INVENTOR.
William Phillips
BY
ATTORNEY

United States Patent Office 3,598,750
Patented Aug. 10, 1971

3,598,750
PHOTOCHROMIC IMAGE DEVICE
William Phillips, Princeton, N.J., assignor to
RCA Corporation
Filed Nov. 17, 1969, Ser. No. 877,236
Int. Cl. H01j 1/54
U.S. Cl. 252—300  10 Claims

ABSTRACT OF THE DISCLOSURE

An image display and storage device has a photochromic image screen consisting of sodalite having the basic chemical composition $Na_6Al_6Si_6O_{24} \cdot 2NaX$ wherein X is at least one halogen selected from the group consisting of chlorine, bromine and iodine and wherein the sodalite contains from at least 50 parts per million of iron up to the solubility limit of iron in the sodalite. The sodalite is annealed in a reducing atmosphere to produce its photochromic properties. Such an image screen darkens upon exposure to ultraviolet light or cathode ray excitation.

An especially high contrast ratio image screen can be attained utilizing sodalite doped with iron which is treated by heating the sodalite in a fused alkali halide salt bath.

BACKGROUND OF THE INVENTION

The invention herein described was made in the course of or under a contract with the Department of the Navy.

This invention relates to an improved photochromic device and particularly to improved sodalite photochromic image screens and the method of preparation of the sodalite.

Sodalite is known to be a photochromic material as illustrated in U.S. Pat. No. 2,761,846 issued to David V. Medved. In addition, the use of sodalite as a cathodochromic material in a dark trace cathode ray tube is described in U.S. Pat. No. 2,752,521 issued to Henry F. Ivey. The term photochromric materials as used herein refers to materials which can be reversibly switched from one absorption state to another absorption state by means of light. The term cathodochromic material refers to photochromic materials which can be colored by means of electron beam bombardment.

The advent of photochromic and cathodochromic materials opens the possibility of new display and storage devices utilizing the photochromic materials as image screens. An important feature of any photochromic device is the contrast ratio and maximum reversible coloration of the device. It is preferred to have as high a maximum attainable contrast ratio with reversible coloration as possible. For most practical purposes the contrast ratio should be at least equal to 1.4 to 1.

I have found that certain impurity ions when added to sodalite cause an increase in the maximum contrast ratio attainable. My finding is directly opposite to the teachings of Medved. In addition, I have also found that the contrast ratio of sodalite containing particular ionic impurities therein can be increased by treating the sodalite in a manner as hereinafter set forth.

SUMMARY OF THE INVENTION

An image display and storage device has a photochromic image screen consisting of sodalite having the basic chemical composition $Na_6Al_6Si_6O_{24} \cdot 2NaX$ wherein X is at least one halogen and wherein the sodalite contains as an impurity from at least 50 parts per million of iron up the solubility limit of iron in the sodalite.

An especially high contrast ratio image screen can be attained utilizing sodalite doped with iron which is treated by heating it in a fused alkali halide salt bath.

DETAILED DESCRIPTION OF THE INVENTION

Figure 1:
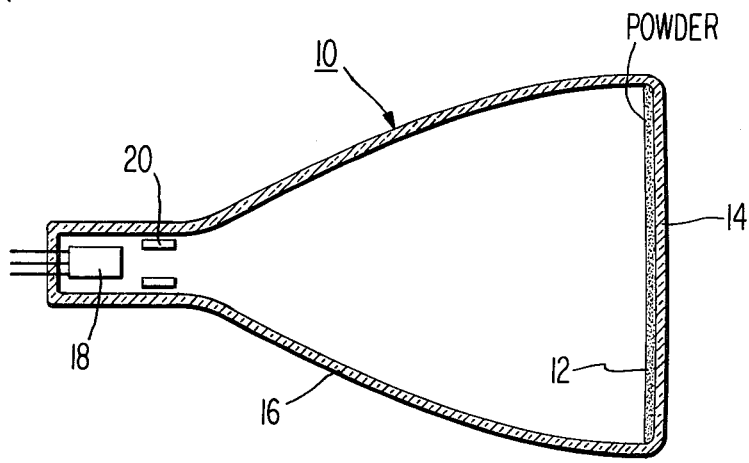
FIG. 1 is a cross-sectional view showing a cathode ray tube having a representative type photochromic image screen.

Referring to FIG. 1, a cathode ray tube 10 is shown having a photochromic image screen 12. In this tube 10, the photochromic screen 12 is supported by an optically transparent faceplate 14. The screen 12 comprises a finely divided powdered cathodochromic sodalite as disclosed herein. The photochromic screen 12 is enclosed in an evacuated envelope 16 of which the faceplate 14 is a part. An electron gun 18 and an electron beam deflecting means 20 are disposed within the envelope for projecting an electron beam onto the screen. Bombardment of the photochromic screen by an electron beam causes coloration of the screen. This coloration can be erased by the use of light within the absorption band of the photochromic. The frequency for erasure depends upon the particular sodalite material employed in the screen. Alternatively the coloration can be erased thermally.

The novel photochromic and cathodochromic image screens comprise an aluminosilicate commonly known as sodalite and represented by the chemical formula

$$Na_6Al_6Si_6O_{24} \cdot 2NaX$$

wherein X is either chlorine, bromine or iodine or a combination thereof. The novel sodalite may also contain some fluorine in place of the other halogens. The feature of the novel compounds is that the sodalite contains at least 50 parts per million of iron. The upper limit to the quantity of iron present is determined by the solubility of the iron in the crystal lattice. This solubility may vary with the mode of preparation of the photochromic material. For example, the solubility of iron in sodalite may be increased by including charge compensating ions in the material, such as sulfur ions, together with the iron. The maximum solubility of iron found in uncompensated sodalite appears to be in the neighborhood of .07 wt. percent. The sodalite material is annealed under reducing conditions to produce its photochromic properties.

The novel image screens may take various forms. For example, the image screen may comprise self-supporting single crystals, hot pressed materials, or crystals held together by a binder. The screen may also comprise an amorphous or glassy variety of sodalite deposited by evaporation or other means. Alternatively, the image screen may be in the form of a layer of powdered material dispersed in a binder and coated upon a substrate as shown in the dark trace cathode ray tube of FIG. 1.

The iron-containing sodalite may be formed as solid solutions of chlorine, bromine or iodine-containing sodalites in any range or relative proportion of halogens in the solid solution. The most striking difference between $Na_6Al_6Si_6O_{24} \cdot 2NaX$ wherein X is chlorine, $$Na_6Al_6Si_6O_{24} \cdot 2NaX$$

wherein X is bromine and $Na_6Al_6Si_6O_{24} \cdot 2NaX$ wherein X is iodine, is the position of the induced absorption band. These absorption bands peak at approximately 5250 A., 5600 A. and 6000 A., respectively. The absorption bands of the various sodalite solid solutions occur between the above values.

The properties of the novel photochromic image screens were studied under electron beam excitation. The image screens were in the form of 2-inch square screens having powdered sodalite with a powder size of from 20 to 30 microns dispersed upon the screen. The screens were aluminized to increase their whiteness and to render them completely opaque to transmitted light. The screens were mounted in an evacuated electron beam apparatus and were excited over a given area with an electron beam accelerating voltage of about 28 kv. at a current density of from 0.1 to 5 microamperes per square inch for 1, 2, or 5 seconds. A tungsten light source was utilized for illuminating the screen. The source was adjusted until the diffuse reflected screen luminance, as measured by a spot brightness meter normal to the screen, reached a convenient value of, for example, either 1 or 10 foot lamberts. At these illuminations, the contrast ratio is essentially independent of light level, and the decay rate of the coloration is slow compared with the exposure time. The luminance was determined both prior to and subsequent to electron beam exposure. The contrast ratio was then calculated from the following relationship:

$$C.R. = \frac{\text{reflectivity unswitched}}{\text{reflectivity switched}} = \frac{\text{luminance unswitched}}{\text{luminance switched}}$$

Successively longer exposures were made and the image was erased from the screen after each exposure. As the exposure time is increased, one ultimately reaches a point where some of the induced coloration cannot be erased by light. Such coloration can only be erased by heating the screen. This point is termed the permanent coloration threshold of the image screen. Since the preferred mode of image erasure is with the use of light rather than heat, it is desirable to have as high a permanent coloration threshold as possible.

Figure 2:
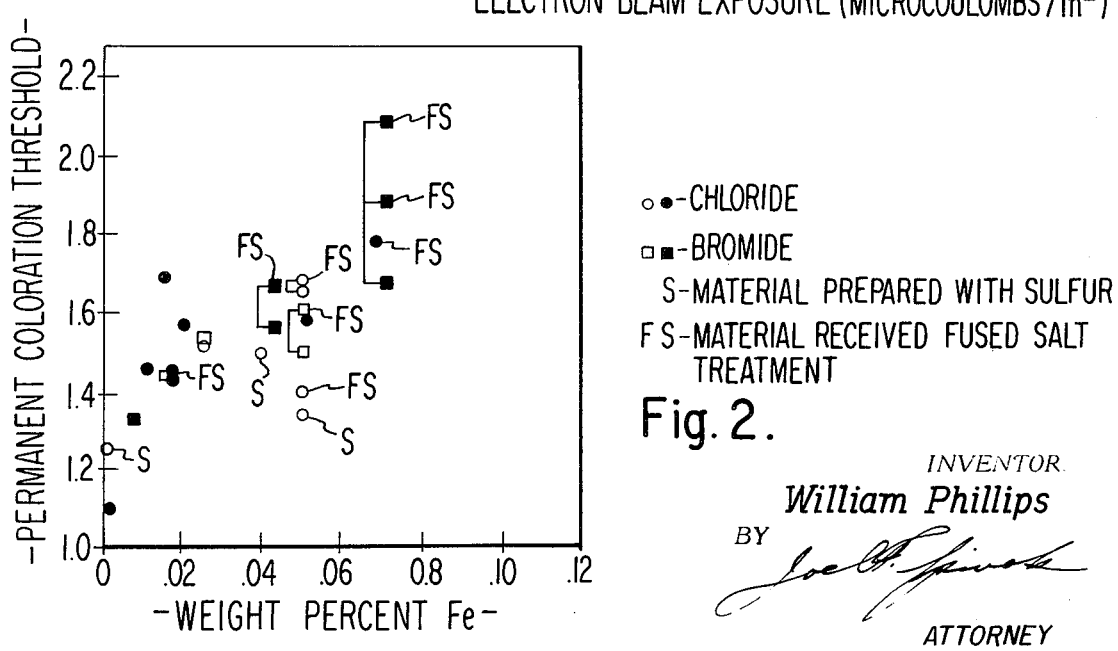
FIG. 2 is a plot of experimental results showing the permanent coloration threshold of a sodalite image screen as a function of the quantity of iron in the sodalite. The plot includes data from samples of sodalite containing either chlorine or bromine as the halogen therein and of samples which have been treated in a fused alkali halide salt bath as well as untreated samples.

FIG. 2 represents the effect of the iron concentration in sodalite upon the permanent coloration threshold. The permanent coloration threshold is given in units representing the contrast ratio at the time when permanent coloration first appears. The data shown in FIG. 2 represents samples of the chlorine type sodalite, the bromine type sodalite and chlorine and bromine type sodalites having sulfur therein as well as iron. In addition, data is given for samples which have undergone a fused salt treatment. It can be seen from FIG. 2 that in order to achieve a contrast ratio of about 1.4 to 1 the sodalite should contain at least about 100 parts per million of iron when uncompensated.

It was found that the contrast ratio at permanent coloration threshold may be further enhanced, at least at low iron concentrations, by the incorporation of sulfur in the crystal. Generally, sulfur is added in concentrations ranging from 0.012 to 0.6 wt. percent.

The data of FIG. 2 also indicates my further discovery that by annealing the sodalite used in the image screens in fused sodium chloride or sodium chloride-sodium bromide baths, the contrast ratio at the permanent coloration threshold can be enhanced still further. Typical annealing temperatures are in the range of 800–850° C.

Figure 3:
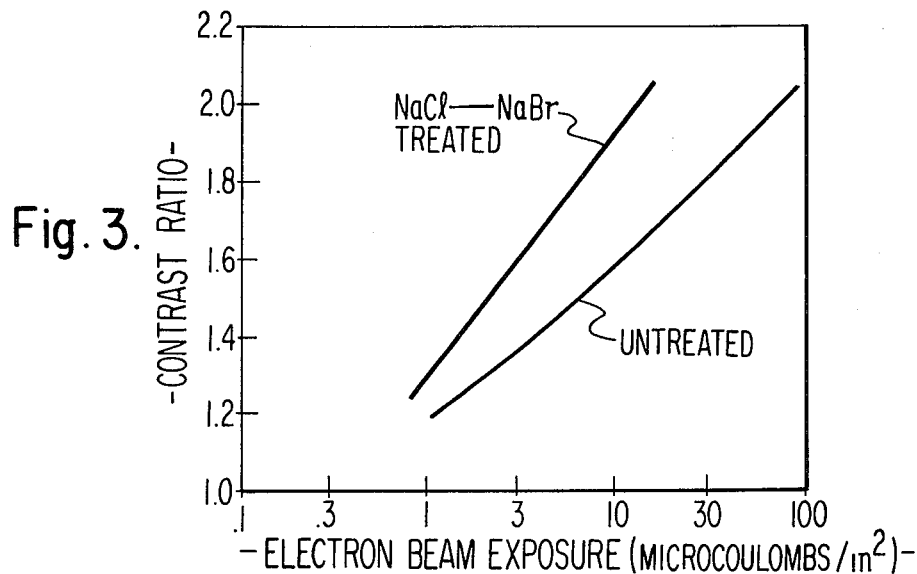
FIG. 3 is a plot of contrast ratio as a function of electron beam exposure of a photochromic screen showing the effect of the fused salt treatment of the sodalite upon the contrast ratio.

FIG. 3 is a plot of the contrast ratio of a screen consisting of powdered sodalite having the chemical formula $Na_6Al_6Si_6O_{24} \cdot 2NaBr$ and doped with 0.071 wt. percent iron. The lower curve on the figure represents the results from a screen in which the sodalite was not treated with a fused salt while the upper curve represents a screen wherein the sodalite had been treated in a sodium chloride-sodium bromide fused salt bath for 4 hours at 850° C. It can be seen from these curves that a substantially greater amount of electron beam exposure is required to color image screens having untreated sodalite as compared to image screens having fused salt treated sodalite to reach a given contrast ratio. Additionally, as aforementioned, the permanent contrast threshold of the image screens can also be increased by the fused salt treatments of the sodalite. This effect is generally larger in materials having a relatively high iron concentration. The table given below gives the contrast ratio of several novel sodalite screens observed under white light and filtered light illumination. The particular filters utilized were Corning color filters Nos. 4–97 and 3–69. These filters were placed between the light source and the photochromic screen. This combination of filters has a transmission peak at about 5600 A. corresponding to the absorption maximum of $Na_6Al_6Si_6O_{24} \cdot 2NaBr$.

TABLE

Typical performance on 40-inch screen

| Screen material | | White light | | |
|---|---|---|---|---|
| Formula | Fe-concentration, wt. percent | CRT luminance (ft.-lamberts) | Screen luminance (ft.-lamberts) | Contrast |
| $Na_8Al_6Si_6O_{24}ClBr$ | 0.046 | 3,700 | 10 | 1.54 to 1. |
| $Na_8Al_6Si_6O_{24}Br_2$ | 0.071 | 3,700 | 10 | 1.54 to 1. |
| $Na_8Al_6Si_6O_{24}Br_2$ | 0.04 | 3,700 | 10 | 1.67 to 1. |
| | | Filtered light | | |
| $Na_8Al_6Si_6O_{24}ClBr$ | 0.046 | 2,100 | 5.5 | 1.84 to 1. |
| $Na_8Al_6Si_6O_{24}Br_2$ | 0.071 | 2,300 | 6.0 | 2.0 to 1. |
| $Na_8Al_6Si_6O_{24}Br_2$ | 0.04 | 2,100 | 5.5 | 2.0 to 1. |

Iron-doped sodalite can be prepared under hydrothermal growth conditions in a 15 N NaOH solution. The hydrothermal reaction mixture also includes $H_2SiO_3$, $Al_2O_3$, NaX where X is at least one halogen and $Fe_2O_3$, $Na_2SO_4$ or other charge compensators may also be added to the mixture.

The resultant crystalline sodalite material is then annealed in a reducing atmosphere, typically in dry hydrogen at 850 to 950° C. for 1 to 3 hours.

Alternatively, the sodalite can be doped with sulfur by annealing the material in fused $NaCl-Na_2SO_4$ in a hydrogen atmosphere.

It may be noted that the novel image screens darken upon exposure to ultraviolet light as well as upon cathode ray excitation. In addition, coloration of the novel image screen is thermally erasable at lower temperatures than prior art sodalite image screens.

What I claim is:

1. A photochromic image screen comprising a substrate and a photochromic coating on said substrate, said coating comprising an iron-doped sodalite represented essentially by the basic formula $Na_6Al_6Si_6O_{24} \cdot 2NaX$ wherein X is at least one halogen, said iron being present in a concentration of at least 50 weight parts per million and up to the solubility limit of iron in the sodalite.

2. The photochromic image screen recited in claim 1 wherein said iron concentration is from about 50 to about 700 p.p.m.

3. A photochromic image screen comprising a substrate and a photochromic coating thereon, said image screen having a contrast ratio of at least 1.4 at the permanent coloration threshold of said screen, said photochromic coating comprising a sodalite material represented essentially by the basic formula $Na_6Al_6Si_6O_{24} \cdot 2NaX$ wherein X is at least one halogen containing iron as an impurity ion therein, said iron being present at a concentration of from 50 p.p.m. up to its solubility limit in the crystal lattice of said sodalite.

4. The photochromic image screen recited in claim 3 wherein said sodalite also contains from 0.01 to 0.6 wt. percent sulfur.

5. The photochromic image screen recited in claim 3 wherein the permanent contrast threshold of said sodalite has been enhanced by annealing said sodalite in a fused alkali-halide salt bath.

6. In a cathode ray tube comprising an evacuated envelope including a cathodochromic image screen faceplate and electron gun means mounted in said envelope and spaced from said faceplate, the improvement comprising a cathodochromic image screen layer on said faceplate comprising sodalite crystals represented essentially by the basic formula $Na_6Al_6Si_6O_{24} \cdot 2NaX$ wherein X is at least one halogen having at least 50 p.p.m. of iron ions and up to the solubility limit of iron ions in the sodalite crystals therein, said image screen having a minimum contrast ratio at its permanent coloration threshold, upon electron beam excitation, of 1.4.

7. A photochromic image screen comprising a substrate having a photochromic coating thereon, said coating comprising an iron-doped sodalite, said iron being present in a concentration of at least 50 parts per million by weight and up to the solubility limit of iron in the sodalite and said sodalite represented essentially by the basic formula $Na_6Al_6Si_6O_{24} \cdot 2NaX$ wherein X is at least one halogen selected from the group consisting of chlorine, bromine and iodine.

8. A method for increasing the contrast ratio of the permanent coloration threshold of photochromic iron-doped sodalite represented essentially by the basic formula $Na_6Al_6Si_6O_{24} \cdot 2NaX$ where X is at least one halogen comprising the step of annealing said sodalite in an alkali halide fused salt bath the sodalite having an iron concentration of from about 50 weight parts per million up to the solubility limits of the iron in the sodalite.

9. The method recited in claim 8 wherein said fused salt bath consists of sodium chloride and sodium bromide.

10. The method as recited in claim 8 wherein the fused salt bath consists of sodium chloride and sodium bromide and the annealing temperature is in the neighborhood of 800–850° C.

References Cited

UNITED STATES PATENTS

| | | | |
|---|---|---|---|
| 2,504,674 | 4/1950 | Fonda | 117—33.5 |
| 2,761,846 | 9/1956 | Medved | 252—301.4 |

OTHER REFERENCES

Mellor, Inorganic and Theoretical Chemistry, pp. 580–584.

Kirk, "Role of Sulfur in the Luminescence and Coloration of Some Aluminosilicates."

Kirk, "The Luminescence and Tenebrescene of Mutual and Synthetic Sodalite," pp. 22–31.

GEORGE F. LESMES, Primary Examiner

J. P. BRAMMER, Assistant Examiner

U.S. Cl. X.R.

117—33.5; 252—301.5; 313—65R